(No Model.)  2 Sheets—Sheet 1.

S. P. GRAHAM.
DRILL CHUCK.

No. 318,466.  Patented May 26, 1885.

Witnesses
A. Edmunds
Carl Hayden

Inventor
Simon Peter Graham
By P. J. Edmunds
Attorney (No Model.) 2 Sheets—Sheet 2.

S. P. GRAHAM.
DRILL CHUCK.

No. 318,466. Patented May 26, 1885.

Witnesses
A. Edmunds
Carl Hayden

Inventor
Simon Peter Graham
By P. J. Edmunds
Attorney

UNITED STATES PATENT OFFICE.

SIMON PETER GRAHAM, OF LONDON, ONTARIO, CANADA.

DRILL-CHUCK.

SPECIFICATION forming part of Letters Patent No. 318,466, dated May 26, 1885.

Application filed September 24, 1884. (No model.)

*To all whom it may concern:*

Be it known that I, SIMON PETER GRAHAM, a citizen of the United States, at present residing at London, in the Province of Ontario, in the Dominion of Canada, machinist, have invented a new and useful Drill and Lathe Chuck, of which the following is a specification.

This invention relates to a device to be attached to a lathe or drilling-machine for grasping and firmly holding drills or any other boring-tools; and it consists of improved jaws and slides provided with flanges on their adjacent sides, of a parallel sleeve provided with a screw-thread on its inner face and an inward flange in combination therewith, and also of a chuck in combination with a bar provided with a tapered groove, as will be hereinafter more fully described and claimed.

Figures 1, 2:
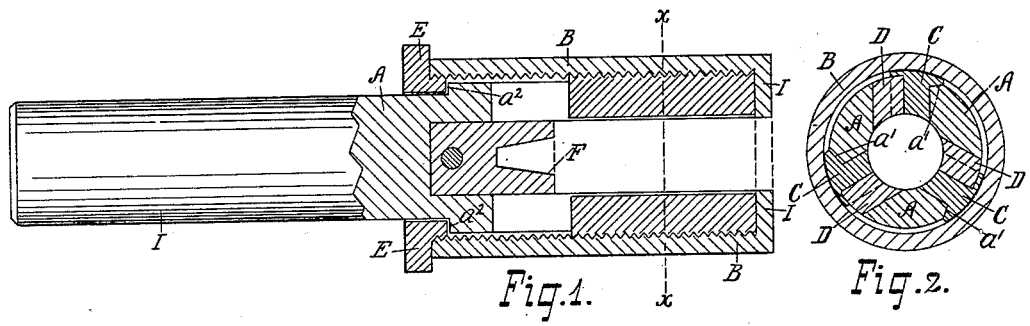
Figures 3, 4:
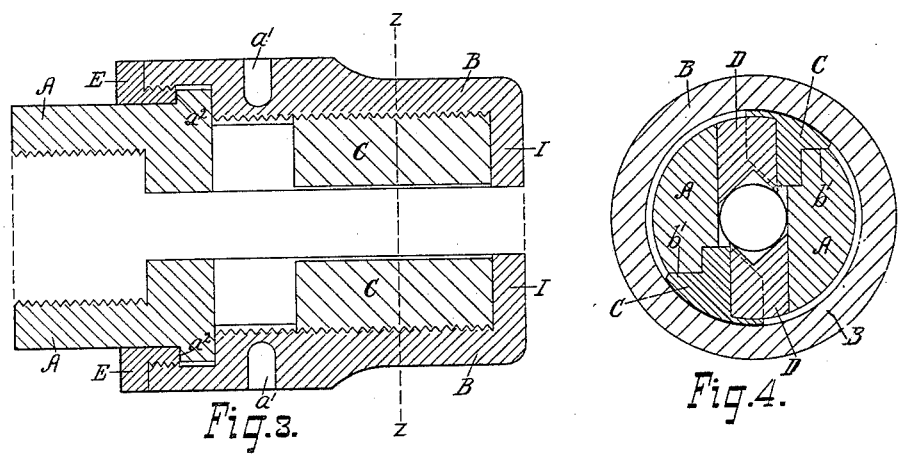
Figures 5, 6:
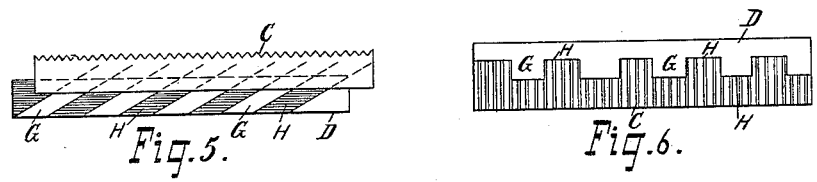
Figure 7:
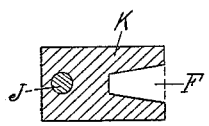

Reference being had to the accompanying drawings, Figure 1 is a longitudinal sectional view of my chuck in combination with a bar provided with a tapered groove. Fig. 2 is a cross-sectional view of same on the line $x\ x$ of Fig. 1. Fig. 3 is a longitudinal sectional view of my improved chuck when constructed without a bar provided with a tapered groove. Fig. 4 is a cross-sectional view of same on the line $z\ z$ of Fig. 3. Fig. 5 is a side elevation of the slide and jaws. Fig. 6 is a plan view of Fig. 5. Fig. 7 is a detail sectional view of a bar provided with a tapered groove.

A designates the body of the chuck; B, the parallel sleeve provided with a screw-thread extending throughout the whole of its inner face; C C, the slides provided with a screw-thread on their outer faces, and D D the jaws.

The body A of the chuck may be secured to a lathe-spindle in any suitable manner; but it is preferably secured thereto by a screw-thread meshing with another screw-thread direct on the lathe-spindle, as shown in Fig. 3 of annexed drawings, while in Fig. 1 of annexed drawings the body of the chuck is left blank at one end, so as to permit of it being turned to fit the hole of drill or lathe spindle.

The parallel sleeve B is provided at the front end with an inward flange, I, which covers the front end of the slides C and jaws D, for the purpose of preventing the jaws D from moving parallel with the slide C.

As shown in Fig. 3 of annexed drawings, this parallel sleeve B is provided with sockets $a'$, in which a lever is inserted to revolve said parallel sleeve B, which gives a motion back and forth lengthwise of the chuck to the slides C C, and these slides C C moving back and forth cause the jaws D to move to and from the center of said chuck, according to the direction in which the parallel sleeve B is revolved.

E is a nut engaging with a shoulder, $a^2$, on the body A of the chuck, and screw-threaded into the sleeve B to retain said sleeve B in proper position on the chuck.

K is a short bar, of metal, in which a tapered groove, F, is formed. This bar of metal, K, is fitted, driven in, and secured in the inner end of the chuck by a pin, J, passing through the body of the chuck, as well as through the bar K. This bar K, provided with the tapered groove F, is for the purpose of holding drills fitted to the same, which holds the drills when at work and takes the strain of the drill or any other boring-tool off the jaws D D, which jaws are only for the purpose of centering drill and holding it in position.

The jaws D D and slides C C are made with two or more flanges, G G, on their adjacent sides. Between these flanges are the grooves H H, the flanges of one being made to fit in the grooves of the other. These flanges G G are formed on the adjacent sides of said jaw D and slide C at any required angle, according to the pressure necessary to firmly hold the drill or other boring-tool.

The slide C is constructed with a flange, $b'$, on the upper edge in order to give an increased area of wearing-surface to the screw-thread formed thereon, which engages with the screw-thread on the inner face of the sleeve B.

Heretofore the jaws of chucks have been made with one incline on their outer face, which requires the jaw to be much wider at one end than at the other; whereas in my jaws D two or more inclined flanges, G G, are arranged on one side of each jaw, which gives the same size in cross-section throughout the length of my jaw, thereby enabling me to make a chuck of very much smaller diameter, which is of great importance and an advantage to drill-chucks when working in confined positions.

Having thus described my invention, I claim—

1. The jaws D D of the chuck provided with two or more inclined flanges, G G, on each jaw, substantially as shown and described, and for the purpose specified.

2. The slides C C, provided with two or more inclined flanges, G G, on each slide, substantially as shown and described, and for the purpose set forth.

3. The jaws D D, provided with two or more inclined flanges, G G, on each jaw, in combination with slides C C, provided with two or more inclined flanges, G G, on each slide, substantially as shown and described, and for the purpose specified.

4. The combination of the parallel sleeve B, provided with a screw-thread on its inner face, and an inward flange, I, with the slide C, provided with a screw-thread on its outer face directly over the grip of the jaw on the drill, substantially as described.

5. In combination with a chuck, a bar, K, provided with a tapered groove, F, substantially as shown and described, and for the purpose specified.

In testimony whereof I affix my signature in the presence of the two undersigned witnesses.

SIMON PETER GRAHAM.

Witnesses:
P. J. EDMUNDS,
A. EDMUNDS.